United States Patent [19]
Park et al.

[11] 3,930,196
[45] Dec. 30, 1975

[54] BRIDGE RECTIFIER CIRCUITS USING TRANSISTORS AS RECTIFYING ELEMENTS

[75] Inventors: John N. Park, Rexford; Robert L. Steigerwald, Scotia; Loren H. Walker, Schenectady, all of N.Y.

[73] Assignee: General Electric Company, Schenectady, N.Y.

[22] Filed: Nov. 22, 1974

[21] Appl. No.: 526,143

Related U.S. Application Data

[63] Continuation of Ser. No. 412,342, Nov. 2, 1973, abandoned.

[52] U.S. Cl. .................................................. 321/47
[51] Int. Cl.² ........................................... H02M 7/217
[58] Field of Search ...................... 307/254; 321/47

[56] References Cited
UNITED STATES PATENTS 3,582,758 6/1971 Gunn .................................. 321/47
3,667,028 5/1972 Leufgen ............................. 321/47
3,735,235 5/1973 Hamilton et al. ..................... 321/2

OTHER PUBLICATIONS

IBM Journal, "A Symmetrical–Transistor Steering Circuit," J. L. Walsh, Apr., 1957, pp. 185–188.

Primary Examiner—William M. Shoop
Attorney, Agent, or Firm—Donald R. Campbell; Joseph T. Cohen; Jerome C. Squillaro

[57] ABSTRACT

Two full-wave bridge rectifier circuits embodying the invention are disclosed. In each rectifier circuit four transistors and four sets of transformer windings for controlling base current are connected in a bridge configuration. Each transistor is connected in an inverted mode so that voltage blocking is performed by its collector-base junction. High efficiency is achieved by controlling the base current of each transistor in response to the emitter current thereof so that the base current is proportional to the emitter current so as to minimize circuit losses.

2 Claims, 2 Drawing Figures

BRIDGE RECTIFIER CIRCUITS USING TRANSISTORS AS RECTIFYING ELEMENTS

This is a continuation of application Ser. No. 412,342, filed Nov. 2, 1973, and now abandoned.

CROSS REFERENCES TO RELATED PATENT APPLICATIONS

A related copending U.S. patent application, Ser. No. 406,162, filed Oct. 15, 1973, in behalf of the same inventors in whose behalf this patent application is filed, titled "RECTIFIER CIRCUITS USING TRANSISTORS AS RECTIFYING ELEMENTS", discloses half-wave and full-wave rectifier circuits using one and two transistors, respectively, in inverted mode connections. Another copending U.S. patent application Ser. No. 267,262, filed June 28, 1972, in behalf of Thomas E. Anderson and John P. Walden, titled POWER SUPPLY INCLUDING INVERTER HAVING MULTIPLE-WINDING TRANSFORMER AND CONTROL TRANSISTOR FOR CONTROLLING MAIN SWITCHING TRANSISTORS AND PROVIDING OVERCURRENT PROTECTION, now U.S. Pat. No. 3,781,638 granted Dec. 25, 1973, discloses a high frequency inverter circuit capable of providing a single phase, bipolar, rectangular (or square) waveform output voltage which may be employed as the input a.c. power source for the bridge rectifiers herein disclosed.

The entire right, title and interest in and to the inventions described in the aforesaid patent applications, as well as in and to the aforementioned patent applications, and the entire right, title and interest in and to the invention hereinafter disclosed, as well as in and to the patent application of which this specification is a part, are assigned to the same assignee.

BACKGROUND OF THE INVENTION

The subject invention pertains, in general, to full-wave rectifier circuits employing active solid state rectifying elements connected in a bridge configuration; and, in particular, to full-wave rectifier circuits employing transistors which are connected in a bridge configuration and serve as the rectifying elements. The subject invention pertains, more particularly, to full-wave rectifier circuits employing transistors in an inverted mode connection in a bridge configuration.

The earlier-filed U.S. patent application Ser. No. 406,162, of the same inventors in whose behalf this patent application is filed, sets forth various desiderata respecting small, lightweight rectifier circuits suitable for operation at relatively low voltage, relatively high current and relatively high frequency; said earlier-filed patent application also sets forth various limitations respecting the use of passive rectifying elements such as silicon diodes, germanium diodes and Schottky (hot carrier) diodes. The same earlier-filed patent application also identifies one publication disclosing the use of a transistor as a rectifying element in a half-wave rectifier circuit; i.e., "New Techniques In Power Control" by J. B. Gunn, Digest of Technical Papers, 1970 IEEE International Solid State Circuit Conference, at pages 90 and 91.

SUMMARY OF THE INVENTION

One object of the invention is to provide a high efficiency, full-wave bridge rectifier circuit.

Another object of the invention is to provide a small volumn, lightweight, full-wave bridge rectifier circuit.

Another object of the invention is to provide a rectifier circuit employing active solid state rectifying means in a full bridge configuration.

Another object of the invention is to provide a rectifier circuit employing transistors as rectifying elements in a full bridge configuration.

Another object of the invention is to provide a high efficiency, full-wave, bridge rectifier circuit operating at relatively high frequency, relatively low voltage and relatively high current.

Another object of the invention is to provide a full-wave bridge circuit employing transistors which may be fabricated as part of an integrated circuit assembly.

One feature of the full-wave bridge rectifier circuit according to the invention is the employment of four transistors arranged in a full bridge configuration wherein each transistor is connected in an inverted mode so that voltage blocking is performed by its collector-base junction. One advantage of the aforementioned inverted mode transistor connection is that available silicon transistors may be used despite their having a relatively low value of $BV_{EBO}$ since the voltage blocking function is performed by the collector-base junction of the transistor. Another advantage is that conventional transistor designs having low $R_{sat}$ exhibit very low $V_{CE}$ (SAT) for inverted conduction.

Another feature of the invention is the employment of four pairs of magnetically coupled windings in combination with four transistors connected in an inverted mode in the full-wave bridge circuit configuration; each transistor having one pair of windings associated therewith for the purpose of controlling the base current of the transistor in response to its emitter current. The base current is controlled so that it is maintained at a near optimum magnitude; i.e., a magnitude not in excess of that required so that circuit losses are kept at a minimum.

Another feature of the invention is the use of magnetic core member(s) so that at least two pairs of the magnetically coupled windings can share a common core member. One advantage of using a common magnetic core member for at least two pairs of magnetically coupled windings is that the overall size is minimized due partly to the sharing of the magnetic core material and due, mainly, to cancellation of the d.c. components of magnetic flux resulting from currents associated with two transistors operating in combinaiton with the two pairs of magnetically coupled windings.

Another feature of the full-wave bridge rectifier circuit according to the invention is the employment of four diodes in combination with the four transistors of the bridge configuration; each transistor having a diode associated therewith. Each diode is connected between the emitter and collector of the transistor with which it is associated. One advantage of using diodes in combination with transistors in the bridge configuration is that each diode provides a path for the initial rectified current at turn "on" of the transistor with which it is associated. An additional advantage is that the aforesaid initial rectified current forces the initiation of regenerative action by an associated pair of magnetically coupled windings thereby improving switching efficiency of the transistor with which the diode and pair of windings is associated.

Other objects, as well as other features and advantages of the invention appear hereinafter whereat two exemplary embodiments of the invention are disclosed for the purpose of illustrating the invention; said disclosures including the accompanying drawing figures, the content of which is hereinafter described.

DRAWINGS

DETAILED DESCRIPTION

Figure 1:
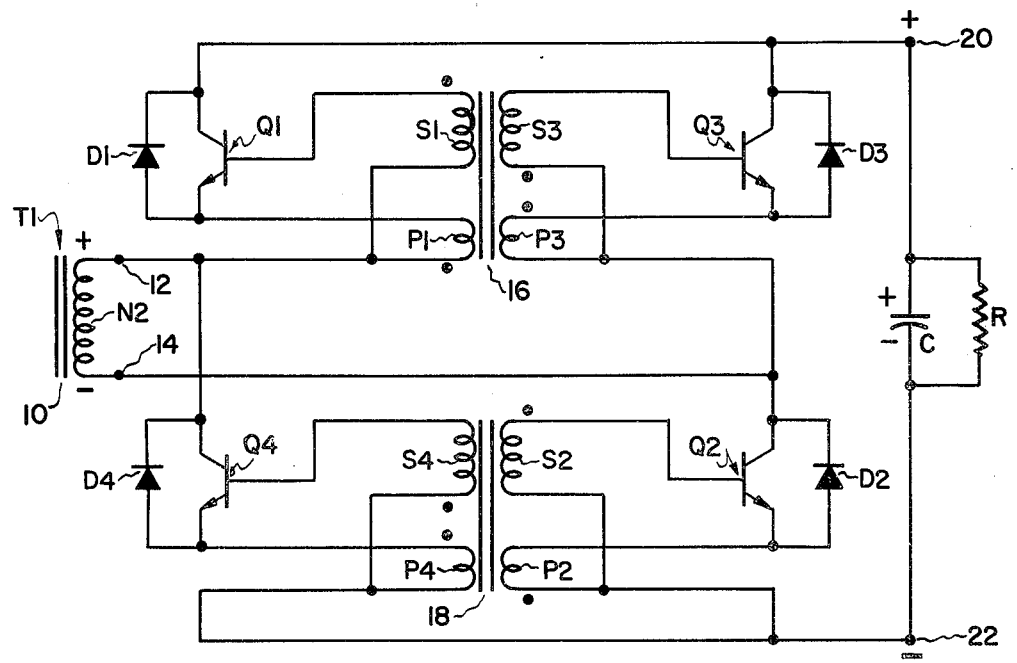
FIG. 1 is a schematic diagram of a full-wave bridge rectifier circuit in accordance with one exemplary embodiment of the invention.

The full-wave bridge rectifier circuit shown at FIG. 1 employs a power transformer designated generally by the reference T1. Transformer T1 includes a magnetic core member 10 which has a secondary winding N2 wound thereabout in addition to a primary winding (not shown). The magnetic core member 10 is preferably of ferrite material inasmuch as transformer T1 is intended to operate at a relatively high frequency (e.g., up to 50 kilohertz). The secondary winding N2 has two terminals 12 and 14 at opposite ends thereof. During a half cycle of single phase voltage applied to the transformer T1 the relative voltage polarities at the terminals 12 and 14 are as indicated at FIG. 1. For example, terminal 12 is marked with a plus sign (+) and terminal 14 is marked with a negative sign (−) to indicate that terminal 12 is positive relative to terminal 14. As is well known, during the next succeeding half cycle of single phase voltage applied to transformer T1, the relative voltage polarities of the aforesaid terminals 12 and 14 on secondary winding N2 reverse.

Four NPN silicon junction transistors Q1, Q2, Q3 and Q4 are provided. Each transistor has an emitter, a base and a collector. Four diodes D1, D2, D3 and D4 are also provided. Each of the diodes has an anode and a cathode. As shown, the anode of diode D1 is electrically connected to the emitter of transistor Q1 and the cathode of diode D1 is electrically connected to the collector of transistor Q1. The diodes D2, D3 and D4 are similarly connected to the emitters and collectors of the transistors Q2, A3 and Q4, respectively.

As shown at FIG. 1 each transistor has a separate set of current control transformer windings associated therewith. A first set of current control transformer windings associated with transistor Q1 includes a primary winding P1 and a secondary winding S1. A second set of current control transformer windings associated with the transistor Q2 includes a primary winding P2 and a secondary winding S2. A third set of current control transformer windings associated with transistor Q3 includes a primary winding P3 and a secondary winding S3. Likewise, a fourth set of current control transformer windings associated with transistor Q4 includes a primary winding P4 and a secondary winding S4. As indicated at FIG. 1 the primary and secondary windings of each set of current control transformer windings are magnetically coupled with each other and, as indicated at FIG. 1, with the windings of another set of current control transformer windings. As indicated, a single, closed, magnetic core member 16 is commonly shared by all of the windings P1, S1, P3 and S3. Similarly, another single, closed, magnetic core member 18 is commonly shared by all of the windings P2, S2, P4 and S4. Since the full-wave bridge rectifier circuit illustrated at FIG. 1 handles high frequencies (up to 50 kilohertz) the magnetic core members 16 and 18 are of ferrite material. The ends of the various current control transformer windings have the relative winding polarities indicated at FIG. 1 by the black dots in accordance with convention. As indicated at FIG. 1 the primary and secondary windings of each set of transformer windings are also electrically connected. For example, one end of primary winding P1 is electrically connected with one end of secondary winding S1; the commonly connected ends of windings P1 and S1 having opposing winding polarities as shown. The other sets of primary and secondary windings (P2-S2, P3-S3 and P4-S4) are similarly connected, electrically, and have the indicated winding polarities.

As shown, the collectors of transistors Q1 and Q3 are electrically connected to a common output terminal 20, or node. In the arrangement shown at FIG. 1 the output terminal 20 serves as a positive output terminal. Also, the commonly connected ends of the windings P2–S2 and P4–S4 are electrically connected to another output terminal 22, or node. The output terminal 22 serves as a negative output terminal in the arrangement shown at FIG. 1. Electrically connected between the positive and negative output terminals 20 and 22 is the parallel combination of a capacitor C and a resistance element R.

OPERATION OF FULL-WAVE BRIDGE RECTIFIER CIRUIT OF FIG. 1

The transformer T1 in the full-wave bridge rectifier circuit of FIG. 1 may be supplied with a single phase voltage, the waveform of which may be sinusoidal, square, or rectangular. It is often easier, and more economical, to generate a non-sinusoidal waveform. Therefore, it is assumed in the description hereinafter set forth that the voltage between terminals 12 and 14 of transformer winding N2 is a single-phase, bipolar, rectangular wave voltage. A voltage having such a waveform could, for example, be supplied to the primary winding (not shown) of power transformer T1 from the output terminals of a high frequency inverter circuit like, or similar, to the one disclosed in the previously mentioned U.S. Pat. No. 3,781,638. The frequency of the single-phase, bipolar voltage supplied to the transformer T1 is preferably relatively high; e.g., 20 kilohertz, or more. The use of high frequencies is desirable because the volume and weight of the magnetic materials may be considerably reduced.

For purposes of discussion it is assumed, initially, that the rectangular wave voltage across the winding N2 is in its first half-cycle excursion and going positive so that the terminals 12 and 14 have the instantaneous relative positive and negative voltage polarities indicated at FIG. 1. It is also assumed, initially, that all of the transistors are non-conducting; i.e., the transistors Q1, Q2, Q3 and Q4 are "off". Therefore, in accordance with conventional current direction respecting the positive voltage polarity at terminal 12 and the negative voltage polarity at terminal 14, a starting, or initial, current between the former and latter terminals is established in the primary winding P1, the diode D1, the parallel RC combination between the output terminals 20 and 22, the primary winding P2 and the diode D2. The output terminal 20 is at a positive potential relative to the output terminal 22. The diodes D1 and D2 are initially conductive because the voltages at their anodes are more positive than at their cathodes. Even though the diodes D1 and D2 are conducting (i.e., "on") the transistors Q1 and Q2 are non-conducting (i.e., "off"). The transistors Q1 and Q2 remain "off"

for a short period while the diodes D1 and D2 conduct the starting, or initial, current. Because of the relative voltage polarities between their cathodes and anodes, the diodes D3 and D4 do not conduct; i.e., they are "off". With diodes D3 and D4 "off" the primary windings P3 and P4 do not conduct starting current. The secondary windings S3 and S4 cannot develop the driving voltages necessary to provide the base currents required to turn "on" transistors Q3 and Q4, respectively. Each of the collector-base junctions of transistors Q3 and Q4 blocks essentially the full peak voltage developed between the output terminals 20 and 22; the collector-base junction being, normally, the higher voltage junction.

The current in diodes D1 and D2 is also in the windings P1 and P2. Due to current transformer action proportional currents appear in the windings S1 and S2. As a consequence, there is initiated currents into the bases of transistors Q1 and Q2. Because of the aforesaid base currents transistors Q1 and Q2 become turned "on" (i.e., become conducting so that currents are into their emitters and out of their collectors) and provide a low impedance path between terminals 12 and 14. The aforesaid low impedance path includes the following elements in series between the terminals 12 and 14: winding P1, emitter-collector of transistor Q1, the parallel RC elements, winding P2 and the emitter-collector of transistor Q2.

However, the transistors Q1 and Q2 are not turned "on" at the same instant of time that the diodes D1 and D2 begin conducting. There is a short time delay before transistors Q1 and Q2 become turned "on". The use of the diodes D1 and D2 permits the rapid initiation of base current in transistors Q1 and Q2, respectively, thereby turning transistors Q1 and Q2 "on" rapidly. The aforementioned short time delay period occurring between the turning "on" of diode D1 and D2 and the turning "on" of the transistors Q1 and Q2 with which said diodes are associated is considerably shortened because as soon as diodes D1 and D2 begin conducting the secondary windings S1 and S2 inject current into the bases of transistors Q1 and Q2 so as to cause the rapid turning "on" of these transistors. When transistor Q1 is turned "on" and is conducting it shunts the diode D1 and, in effect, the voltage drop across the diode D1 is considerably lowered. Similarly, when transistor Q2 is turned "on" and is conducting it shunts the diode D2 and, in effect, the voltage drop across the diode D2 is also considerably lowered. Eventually, the current in diodes D1 and D2 goes to zero due to the shunting action of transistors Q1 and Q2, respectively.

The primary windings P1 and P2 and their associated secondary windings S1 and S2 also perform the important function of controlling, or regulating, the magnitude of the base currents of transistors Q1 and Q2, respectively. The base current magnitudes are controlled such that they are proportional to the emitter current magnitudes. Since the emitter current of transistor Q1 is in the primary winding P1 the magnetic coupling between the windings P1 and S1 enables the secondary winding S1 to develop a current of proper magnitude and polarity, in response to the emitter current in primary winding P1, (i.e., to cause a base current of near optimum magnitude in transistor Q1). Similarly, since the emitter current of transistor Q2 is in the primary winding P2, the magnetic coupling between the windings P2 and S2 enables the secondary winding S2 to develop a current of proper magnitude and polarity, in response to the emitter current in the primary winding P2, (i.e., to cause a base current in transistor Q2 of near optimum magnitude). More particularly, the magnitudes of the base currents in transistors Q1 and Q2 are proportional to the magnitudes of the emitter currents of these transistors. If the base current has a greater magnitude than is required for sustaining conduction in the particular transistor, the excess base current causes losses, the magnitude of which may be significant. Hence, in optimizing the base current the ideal situation to be achieved would be to provide base current of a magnitude which is sufficient to minimize the voltage drop between terminals 12 and 20 as well as between terminals 22 and 14. Therefore, the set of windings P1–S1, associated with transistor Q1, and the set of windings P2–S2, associated with transistor Q2, function as aforesaid so that the aforementioned ideal situation may be closely approached. Therefore, high efficiency is maintained at all levels of load current since the base currents are proportional to the emitter currents and are never significantly in excess of that required.

The transistors Q1 and Q2 continue to conduct after the current in the diodes D1 and D2 goes to zero due to the action of the transistors. As long as the transformer terminal 12 is positive and both transistors Q1 and Q2 are "on" the current is out of the collector of transistor Q1, through the parallel RC combination between the terminals 20 and 22, through the primary winding P2 and into the emitter of transistor Q2. Collector current is out of transistor Q2 and into the terminal 14 of transformer T1. The charge on the capacitor C increases due to the collector current out of transistor Q1 and the voltage at terminal 20 approaches the peak voltage at the transformer terminal 12. More particularly, the output terminal 20 and the upper plate of capacitor C are charged to a positive potential, the magnitude of which is the peak positive voltage of the positive rectangular wave voltage occurring at the terminal 12 during each positive half cycle of the rectangular wave voltage across the winding N2 of transformer T1. Because of the parallel connection between the resistance element R and the capacitor C the resistance element R has the same voltage across it as is across the capacitor C. At the end of the positive half cycle the positive voltage at the terminal 12 begins to diminish in amplitude, or magnitude, as it starts to fall towards zero volts. At some point during its fall toward zero voltage the diminishing positive potential at the terminal 12 becomes less positive than the positive potential at the output terminal 20. As a result, current momentarily reverses its direction and is now from terminal 20, into the collector of transistor Q1, out of the emitter of transistor Q1 and into the primary winding P1. Similarly, terminal 14 of transformer T1 is more positive than output terminal 22 so that current is from terminal 14 into the collector of transistor Q2, out of the emitter of transistor Q2 and into the primary winding P2. Since the current in the primary windings P1 and P2 are in a reverse direction, the relative voltage polarities on the secondary windings S1 and S2 are changed so that base current is out of the transistor Q1 and out of the transistor Q2. These base currents are in such directions as to hasten the turn "off" of the transistors Q1 and Q2. Thus, for the transistors Q1 and Q2 the collector, emitter and base currents are reversed until the stored charges in these transistors are depleted. The aforesaid reversed currents in transistors Q1 and Q2 may continue even when the voltage at terminal 12 becomes zero.

During the time that transistors Q1 and Q2 are conducting current in the aforesaid reverse directions the terminal 14 of power transformer T1 is becoming more positive relative to terminal 12. During the short period of reverse conduction in transistors Q1 and Q2 the positive potential at the output terminal 20 is diminishing in magnitude due to the discharge of the capacitor C into the collector of the transistor Q1. Meanwhile, when the increasing positive potential at the terminal 14 exceeds the decreasing positive potential at the terminal 20 the diodes D3 and D4 turn "on". More particularly, diode D3 turns on because terminal 14 and the anode of diode D3 are more positive than the cathode of diode D3 and the terminal 20; diode D4 turns on because the anode of diode D4 and terminal 22 are more positive than the cathode of diode D4 and the terminal 12. Thus, there exists a momentary condition wherein diodes D3 and D4 are forward conducting and transistors Q1 and Q2 are conducting reverse currents as described hereinbefore. Accordingly, for a short interval of time current is out of the cathode of diode D3 and into the collector of transistor Q1. Also, current is out of the emitter of transistor Q2 and into the anode of diode D4. Eventually transistors Q1 and Q2 turn "off" because of actions, hereinbefore set forth, of the secondary windings S1 and S2 in driving the base currents out of the transistors Q1 and Q2.

Shortly after the diodes D3 and D4 turn "on" the transistors Q3 and Q4 associated therewith turn "on". Transistors Q3 and Q4 turn "on" when base current is supplied to these transistors from the secondary windings S3 and S4, respectively. Thus, transistors Q3 and Q4 become turned "on" by a sequence of events similar to those hereinbefore described with reference to the initial turn "on" of the transistors Q1 and Q2. When the transistors Q3 and Q4 turn "on" the current in diodes D3 and D4 goes to zero due to the shunting action of the transistors Q3 and Q4.

It is possible that for a very short period of time all transistors Q1, Q2, Q3 and Q4 may be "on" due, primarily, to stored charges in those transistors which are about to turn "off". Also, the period of simultaneous conduction of all transistors Q1, Q2, Q3 and Q4 may be extended by the inductance of the transformer T1. In the case where all transistors Q1, Q2, Q3 and Q4 are "on" and conducting, simultaneously, the collector base and emitter current directions are as follows: current is into the collectors of transistors Q1 and Q2; current is out of the emitters of transistors Q1 and Q2; current is out of the bases of transistors Q1 and Q2; current is out of the collectors of transistors Q3 and Q4; current is into the emitters of transistors Q3 and Q4; and, current is into the bases of transistors Q3 and Q4. Since current is out of the bases of transistors Q1 and Q2 these transistors eventually turn "off", as aforesaid. Turn "off" of the transistors Q1 and Q2 is hastened by the polarity reversals of the windings S1 and S2. Such polarity reversals are n caused by the reverse emitter current directions in the primary windings P1 and P2. Advantageously, since the sets of windings P1–S1 and P2–S2 hasten the turn "off" of transistors Q1 and Q2 the switching losses in these transistors are minimized.

With the terminal 14 of winding N2 at a positive potential relative to terminal 12 transistors Q3 and Q4 continue conducting such that current is from terminal 14, through winding P3, into the emitter of transistor Q3, out of the collector of transistor Q3, into terminal 20, through the parallel RC combination, into terminal 22, into winding P4, into the emitter of transistor Q4 and out of the collector of transistor Q4 to terminal 12. Also, current is through winding S3 into the base of transistor Q3. Similarly, current is through winding S4 into the base of transistor Q4. As was the case when the transistors Q1 and Q2 began to conduct initially (during the first half cycle of the voltage between terminals 12 and 14 when terminal 12 was becoming increasingly more positive) the collector and emitter current directions for the transistors Q3 and Q4 are such that current is into the emitters and out of the collectors. These current directions are the reverse of what they would ordinarily be. Accordingly, the transistors Q3 and Q4 are effectively connected in an inverted mode in the full bridge configuration shown at FIG. 1. More particularly, transistors Q3 and Q4 are in inverted mode conduction during the second half cycle of the rectangular wave voltage across winding N2; and, the transistors Q1 and Q2 are in inverted mode conduction during the preceding, or first, half cycle of rectangular voltage across the winding N2.

The relative polarities of the windings S1 and S2 as well as S3 and S4 are such that the forward base-emitter voltage on the conducting two of the four transistors is impressed as a reverse base-emitter voltage on the blocking, or non-conducting, transistors thereby assuring reliable voltage blocking.

As stated hereinbefore, one feature of the invention resides in the way in which all of the transistors are connected in the full-way bridge rectifier circuit shown at FIG. 1. All transistors, Q1 . . . Q4, are connected in an inverted, or reverse, mode. In FIG. 1 the symbols identified as Q1, Q2, Q3 and Q4 represent NPN transistors. In the exemplary rectifier circuit the transistors are NPN silicon junction transistors. As indicated, each transistor has an emitter, base and collector which are represented in the conventional way. The NPN transistor is normally employed in switching circuits in such a way that current is into its collector toward the collector-base junction and out of its emitter, away from the base-emitter junction. However, when transistors Q1 and Q2 during the first half cycle of voltage are turned "on" and are conducting, their emitter currents are into the transistors toward the base-emitter junctions and their collector currents are out of the transistors and away from the collector-base junctions. The same is true for the emitter and collector currents of transistors Q3 and Q4 during the second, or succeeding, half cycle of voltage. Thus, in FIG. 1 (and in FIG. 2, as well) the conventional transistor symbols are employed and the emitter, collector and base leads are identifiable as in the particular manufacturer's device. However, in FIGS. 1 and 2 the current directions, as hereinbefore described, are the reverse of the normal currnet directions. The advantages of using the transistors in the aforesaid inverted mode connection are as follows: losses are minimized due to the low transistor saturation voltage thereby enabling high efficiency rectification operation; and, voltage blocking is performable by the collector-base junction rather than the emitter-base junction so that low cost, readily available silicon transistors normally having a relatively low $BV_{EBO}$ may be used.

The parameters (e.g., $BV_{EBO}$) respecting various transistor characteristics are known to those skilled in transistor technology. For a detailed meaning of the various parameters see the publication G.E. Transistor Manual, Revised 7th Edition, edited and produced by Semiconductor Products Department, General Electric Company, Electronics Park, Syracuse, New York.

FIG. 2 BRIDGE RECTIFIER

Figure 2:
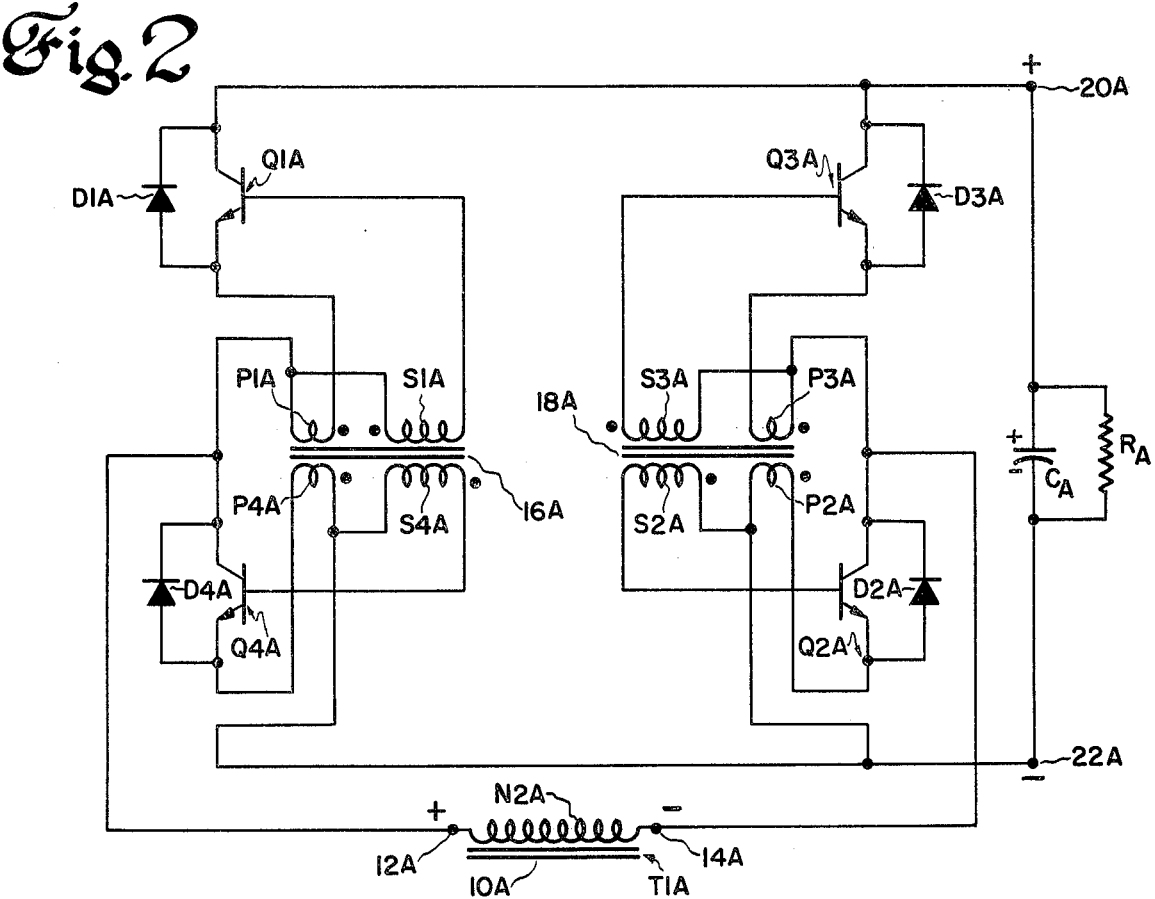
FIG. 2 is a schematic diagram of another full-wave bridge rectifier circuit in accordance with another exemplary embodiment of the invention.

Another single phase, full-wave bridge rectifier circuit, embodying the invention, is illustrated in schematic form at FIG. 2. The various circuit elements employed in the bridge circuit of FIG. 2 are like those employed in the bridge circuit of FIG. 1. Hence, like elements are similarly identified: elements of the FIG. 2 rectifier circuit which are comparable to like elements of the FIG. 1 rectifier circuit are identified with reference characters including the additional letter A. For example, comparable transistors in the FIG. 1 and FIG. 2 circuits are identified as Q1 and Q1A, respectively.

The full-wave bridge rectifier circuit of FIG. 2 differs from that of FIG. 1 in the way in which the various current controls transformer winding sets are associated. For example, in the circuit of FIG. 1 the windings P1–S1 and P3–S3 associated with transistors Q1 and Q3, respectively, share the magnetic core member 16. However, in the rectifier circuit of FIG. 2 the windings P1A–S1A and P4A–S4A associated with transistors Q1A and Q4A, respectively, share the magnetic core member 16A. In FIG. 1 the windings P4–S4 and P2–S2 associated with transistors Q4 and Q2, respectively, share the magnetic core member 18. In FIG. 2 however, the windings P2A–S2A and P3A–S3A associated with the transistors Q2A and Q3A, respectively, share a magnetic core member 18A. The full-wave bridge rectifier circuit of FIG. 2 functions in the same way as the rectifier circuit shown at FIG. 1. Briefly, the transistors Q1A and Q2A are both in an inverted mode connection and are "on" simultaneously while transistors Q3A and Q4A are "off". During the next half cycle of the voltage across the winding N2A the transistors Q3A and Q4A, which are both in an inverted mode connection, are "on" simultaneously while the transistors Q1A and Q2A are "off". Thus, the sets of windings P1A–S1A and P4A–S4A function in a manner similar to the sets of windings P1–S1 and P3–S3 in the circuit of FIG. 1. Similarly, the sets of windings P2A–S2A and P3A–S3A perform in a manner similar to the sets of windings P2–S2 and P4–S4 in FIG. 1.

In the bridge rectifier circuits illustrated at FIGS. 1 and 2, the transistors employed may be PNP transistors instead of the NPN transistors as shown. The PNP transistors would, in accordance with the principles hereinbefore described, be connected in an inverted mode.

Although the foregoing description and accompanying drawings figures set forth two single-phase full-wave bridge rectifier circuits embodying the invention, it is to be understood that the foregoing description and drawing figures are purposeful for providing examples of the invention. Many changes may be made respecting the elements, and combination of elements, of the disclosed rectifier circuits. Such changes may involve, inter alia, substitutions, modifications, rearrangements, etc. of the various elements or devices. Nevertheless, such changes may be made without departing from the spirit of the invention, or from the scope of the claims hereinafter set forth.

What is claimed is:

1. A full wave bridge active rectifying circuit comprising
   a pair of input terminals for high frequency alternating-current input voltage with a frequency between 20 and 50 kilohertz, and a pair of output terminals for supplying unidirectional voltage to a load and between which is directly connected a capacitor,
   first, second, third, and fourth silicon junction transistors each connected for inverted mode operation and each having an emitter, a base, a collector, and a collector-base junction, a diode connected between the emitter and collector of each transistor with a polarity to conduct in the same direction as the respective transistor, and a plurality of current transformers for controlling said respective transistors having only first, second, third, and fourth pairs of primary and secondary windings,
   said first transistor having the collector thereof connected to one output terminal, one end of said first pair of primary and secondary windings being connected together and to one input terminal while the other ends of said first pair of primary and secondary windings are connected respectively to the emitter and base of said first transistor; said second transistor having the collector thereof connected to the other input terminal, one end of said second pair of primary and secondary windings being connected together and to the other output terminal while the other ends of said second pair of primary and secondary windings are connected respectively to the emitter and base of said second transistor; said third transistor having the collector thereof connected to the one input terminal, one end of said third pair of primary and secondary windings being connected together and to the other input terminal while the other ends of said third pair of primary and secondary windings are connected respectively to the emitter and base of said third transistor; said fourth transistor having the collector thereof connected to the one input terminal, one end of said fourth pair of primary and secondary windings being connected together and to the other output terminal while the other ends of said fourth pair of primary and secondary windings are connected respectively to the emitter and base of said fourth transistor; said transistors further being connecged such that voltage blockage is performable by the collector-base junction of each transistor,
   one pair of said first and second pairs of primary and secondary windings and one pair of said third and fourth pairs of primary and secondary windings being magnetically coupled on a current transformer common magnetic core made of ferrite material while the other pair of said first and second pairs of primary and secondary windings and the other pair of said third and fourth pairs of primary and secondary windings are magnetically coupled on another current transformer common magnetic core made of ferrite material.

2. A rectifying circuit according to claim 1 wherein said transistors further are NPN transistors, and said diode connected between the emitter and collector of each transistor has an anode connected to said emitter and a cathode connected to said collector.

* * * * *